(12) United States Patent
VanGilder et al.

(10) Patent No.: US 10,817,033 B2
(45) Date of Patent: Oct. 27, 2020

(54) METHOD AND SYSTEM FOR PREDICTING EFFECT OF A TRANSIENT EVENT ON A DATA CENTER

(71) Applicant: SCHNEIDER ELECTRIC IT CORPORATION, West Kingston, RI (US)

(72) Inventors: James William VanGilder, Pepperell, MA (US); James S. Spitaels, Shrewsbury, MA (US); Christopher M. Healey, Tewksbury, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 344 days.

(21) Appl. No.: 15/841,599

(22) Filed: Dec. 14, 2017

(65) Prior Publication Data

US 2019/0187764 A1 Jun. 20, 2019

(51) Int. Cl.
*G06F 1/20* (2006.01)
*G06F 17/50* (2006.01)
*H05K 7/20* (2006.01)
*G06F 30/13* (2020.01)
(Continued)

(52) U.S. Cl.
CPC .............. *G06F 1/206* (2013.01); *G06F 30/13* (2020.01); *H05K 7/20836* (2013.01); *G06F 2111/10* (2020.01); *G06F 2119/08* (2020.01); *G06F 2200/201* (2013.01)

(58) Field of Classification Search
CPC ...... G06F 1/206; G06F 30/13; G06F 2119/08; G06F 2111/10; G06F 2200/201; H05K 7/20836

See application file for complete search history.

(56) References Cited

U.S. PATENT DOCUMENTS

| 7,378,165 B2 | 5/2008 | Brignone et al. |
| 7,799,474 B2 | 9/2010 | Lyon et al. |
| 7,844,440 B2 | 11/2010 | Nasle et al. |
| (Continued) | | |

FOREIGN PATENT DOCUMENTS

WO 2008144375 A2 11/2008

OTHER PUBLICATIONS

Extended European Search Report from corresponding EP Application No. 18208531.6 dated May 17, 2019.
(Continued)

*Primary Examiner* — Mohammad K Islam
(74) *Attorney, Agent, or Firm* — Lando & Anastasi, LLP

(57) ABSTRACT

A system and method for predicting the effect of a transient event on a data center. A method comprises receiving input data related to a data center that includes at least one equipment rack and at least one cooling provider, the input data including data center architecture information, building data, and operating data, generating a model based at least in part on the input data and on a set of energy balance and heat exchange equations for the data center that account for removed and added heat and a thermal mass of the at least one equipment rack and a thermal mass of the at least one cooling provider, the model configured to predict at least one temperature in the data center during a transient event, and controlling a display device to display the at least one predicted temperature.

18 Claims, 8 Drawing Sheets

(51) Int. Cl.
*G06F 111/10* (2020.01)
*G06F 119/08* (2020.01)

(56) References Cited

U.S. PATENT DOCUMENTS

| | | | |
|---|---|---|---|
| 7,975,156 B2 | 7/2011 | Adman et al. | |
| 7,991,592 B2 | 8/2011 | VanGilder et al. | |
| 8,155,922 B2 | 4/2012 | Loucks | |
| 8,306,794 B2* | 11/2012 | Hamann | H05K 7/20836 |
| | | | 703/5 |
| 8,509,959 B2 | 8/2013 | Zhang et al. | |
| 8,972,217 B2 | 3/2015 | VanGilder et al. | |
| 9,223,905 B2* | 12/2015 | Dalgas | G06F 30/13 |
| 9,418,179 B2 | 8/2016 | Zhang et al. | |
| 9,727,064 B2* | 8/2017 | VanGilder | G05D 23/1917 |
| 9,830,410 B2* | 11/2017 | VanGilder | G01F 1/708 |
| 9,952,103 B2* | 4/2018 | VanGilder | G06F 30/13 |
| 10,025,330 B2* | 7/2018 | VanGilder | G05D 23/1917 |
| 10,034,417 B2* | 7/2018 | Billet | H05K 7/20745 |
| 10,157,245 B2* | 12/2018 | VanGilder | H05K 7/20745 |
| 10,180,261 B1* | 1/2019 | Ross | F24F 11/30 |
| 10,439,912 B2* | 10/2019 | Ghosh | H05K 7/20836 |
| 2004/0262409 A1 | 12/2004 | Crippen et al. | |
| 2007/0038414 A1 | 2/2007 | Rasmussen et al. | |
| 2008/0174954 A1 | 7/2008 | VanGilder et al. | |
| 2011/0213508 A1 | 9/2011 | Mandagere et al. | |
| 2012/0221872 A1 | 8/2012 | Artman et al. | |
| 2014/0039852 A1* | 2/2014 | Zhang | G06F 30/13 |
| | | | 703/2 |
| 2014/0358471 A1* | 12/2014 | VanGilder | G01K 1/024 |
| | | | 702/130 |
| 2015/0234397 A1* | 8/2015 | VanGilder | G06F 30/20 |
| | | | 700/299 |

OTHER PUBLICATIONS

VanGilder, James W.:"Real-Time Data Center Transient Analysis", ASME 2011 Pacific Rim Technical Conference and Exhibition on Packaging and Integration of Electronic and Photonic Systems, Jul. 6, 2011 (Jul. 6, 2011), pp. 1-7, XP002790846, Retrieved from the Internet: URL:https://www.researchgate.net/publicatiion/267597584_Real-Time_Data_Center_Transient_Analysis [retrieved on Apr. 26, 2019].

Abi-Zadeh, Davar et al., "A Transient Analysis of Environmental Conditions for a Mission Critical Facility after a Failure of Power", Arup Mission Criticial Facilities, Feb. 2001, pp. 1-12.

Beaty et al., "High Density Cooling of Data Centers and Telecom Facilities-Part 2," 2005, ASHRAE Transactions, vol. 111, pp. 932-944.

Erden, H.S. et al., "Parameter Estimation for Lumped Capacitance Modeling of Crah Units During Chilled Water Interruption," ASME 2015 Int'l Technical Conference and Exhibition on Packagin and Integration of Electronic and Photonic Micorsysrems and ASME 2015 13th Int'l Conference on Nanochannels, Microchannels, and Minichannels, InterPACKICNMM2015, Jul. 6-9, 2015, San Fransicso, CA, USA, pp. 1-6.

Gao, Tianyi et al., "Development and verification of compact transient heat exchanger models using transient effectivenss methodologies," ResearchGate, International Journal of Heat and Mass Transfer, 87, Aug. 2015, pp. 265-278.

Lin, Paul et al., "Data Center Temperature Rise During a Cooling System Outage," Schneider Electric—Data Center Science Center, White Paper 179, Revision 1, 2014, pp. 1-13.

Marwah, M.; Sharma, R.; Shih, R.; Patel, C.; Bhatia, V.; Mekanapurath, M.; Velumani, R.; Velayudhan, S., 2009, Data analysis, visualization and knowledge discovery in sustainable data centers, In Proceedings of the 2nd Bangalore Annual Compute Conference (COMPUTE '09).

Pakbaznia, E.; Ghasemazar, M.; Pedram, M.:, "Temperature-aware dynamic resource provisioning in a power-optimized datacenter," Design, Automation & Test in Europe Conference & Exhibition (DATE), 2010, vol., No., pp. 124-129, Mar. 8-12, 2010.

Schmidt et al., "Best practices for data center thermal and energy management-review of literature," ASHRAE Transactions, vol. 112, pp. 206-218 [2007].

Zhang, Xuanhang (Simon) et al., "Real-Time Data Center Transient Analysis," ASME 2011 Pacific Rim Technical Conference & Exposition on Packaging and Integration of Electronic and Photonic Systems, InterPACK2011, Jul. 6-8, 2011, Porltand, OR, USA, pp. 1-7.

* cited by examiner

METHOD AND SYSTEM FOR PREDICTING EFFECT OF A TRANSIENT EVENT ON A DATA CENTER

BACKGROUND

1. Technical Field

Aspects and embodiments of the present invention are directed generally to predicting transient cooling performance for a data center.

2. Discussion of Related Art

In data center configurations incorporating equipment racks and coolers, the ability to predict how temperature varies over time in a data center may be important when considering transient events such as the loss of power. For example, a data center operator may like to know how long it takes each rack in a data center to reach some maximum acceptable temperature subject to a specific cooling-failure event.

SUMMARY

Aspects of the present invention are directed to a method that includes receiving input data related to a data center that includes at least one equipment rack and at least one cooling provider, the input data including data center architecture information, building data, and operating data, generating, by a computing device, a model based at least in part on the input data and on a set of energy balance and heat exchange equations for the data center that account for heat added by the at least one equipment rack and removed by the at least one cooling provider, and a thermal mass of the at least one equipment rack and a thermal mass of the at least one cooling provider, the model configured to predict at least one temperature in the data center during a transient event, and controlling a display device to display the at least one predicted temperature.

According to one embodiment, the at least one predicted temperature includes an inlet temperature to the at least one equipment rack and an outlet temperature of cooling fluid associated with the at least one cooling provider.

According to one embodiment, the building data includes thermal resistance data of a ceiling, walls, and floor of the data center.

According to one embodiment, the set of energy balance and heat exchange equations for the model account for heat exchange between at least one of the ceiling, the walls, and the floor of the data center and an external environment to the data center.

According to one embodiment, the input data includes a thermal effectiveness of the at least one equipment rack and the at least one cooling provider.

According to one embodiment, the input data includes one of closed start-up and open start-up information for the at least one cooling provider.

According to one embodiment, the set of energy balance and heat exchange equations utilize a piecewise linear approximation for predicting the at least one temperature. According to one embodiment, the method further includes calculating a cooling runtime based on the model and displaying the calculated cooling runtime on the display device.

According to one embodiment, the method further includes collecting operating data using at least one sensor positioned in the data center. In one embodiment, the collected operating data includes at least one of a power measurement and a cooling flowrate measurement.

According to one embodiment, the method further includes adjusting an operating parameter of equipment in the data center based on the model. In one embodiment, the operating parameter includes a source of electrical power provided to equipment in the data center.

According to one embodiment, the method further includes implementing a design of the data center based on the at least one predicted temperature.

According to one embodiment, the method further includes applying a thermal mass calibration parameter to at least one of the thermal mass of the at least one equipment rack and the thermal mass of the at least one cooling provider.

Another aspect of the present invention is directed to a system that includes a storage device, a display device, a controller coupled to the storage device and the display device and configured to: receive input data from the storage device related to a data center that includes at least one equipment rack and at least one cooling provider, the input data including data center architecture information, building data, and operating data, generate a model based at least in part on the input data and on a set of energy balance and heat exchange equations for the data center that account for heat added by the at least one equipment rack and removed by the at least one cooling provider, and a thermal mass of the at least one equipment rack and a thermal mass of the at least one cooling provider, the model configured to predict at least one temperature in the data center during a transient event, and control the display device to display the at least one predicted temperature.

According to one embodiment, the system further includes an interface coupled to the storage device and configured to receive input data.

According to one embodiment, the input data includes one of closed start-up and open start-up information for the at least one cooling provider.

According to one embodiment, the controller is further configured to generate a heat loss and heat generation profile for a time period following the transient event and to control the display device to display the generated heat loss and heat generation profile.

According to one embodiment, the system further includes at least one sensor positioned in the data center and configured to measure operating data that is included in the input data stored on the storage device.

According to one embodiment, the controller is further configured to adjust an operating parameter of equipment in the data center based on the model.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
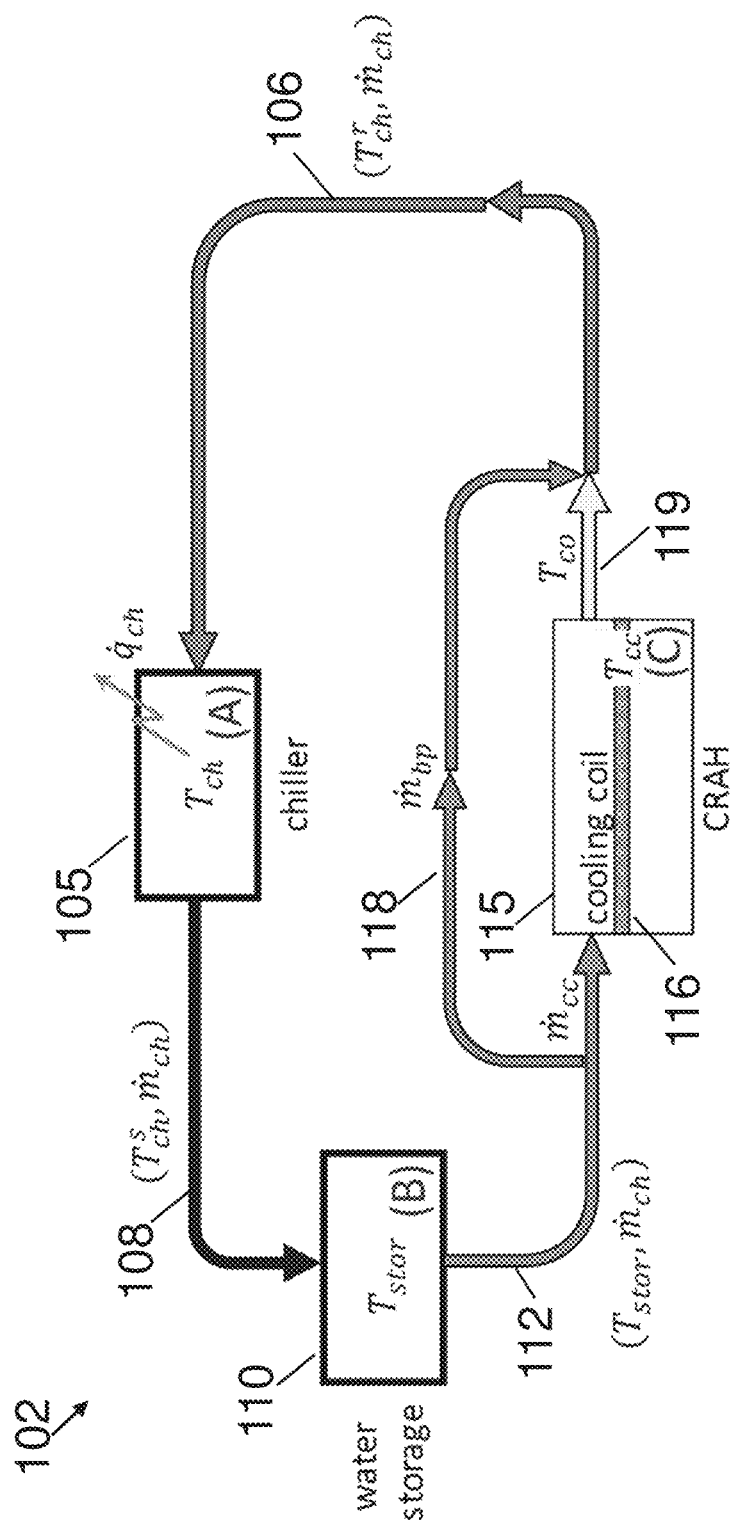
FIG. 1 shows a model of a chilled water system for one example of a data center according to one or more aspects of the invention.

Aspects of this disclosure relate to systems and methods for estimating the effect a utility power outage has on data center temperatures. Data centers typically house high concentrations and densities of information technology equipment, which is collocated in a structure that provides network connectivity, electrical power, and cooling capacity. According to some data center architecture configurations, a raised floor having an air plenum beneath the floor may be used for providing cooling air to the racks. Cool air is distributed from the air plenum to the racks through perforated tiles having open areas. According to some configurations, multiple rows of equipment are organized into hot air and cold air aisles. For instance, equipment racks (e.g., heat producing equipment) and in-row coolers may be arranged in rows in an alternating front/back arrangement creating alternating hot air and cold air aisles with the front of each row of racks facing the cold aisle and the rear of each row or racks facing the hot aisle. In descriptions and claims herein, equipment in racks, or the racks themselves, may be referred to as cooling consumers, and in-row cooling units and/or computer room air conditioners (CRACs) may be referred to as cooling providers.

The methods and systems described herein may be used for analyzing both steady state and transient cooling performance of data centers. In a typical data center, electrical power supplied to a data center is typically supported by uninterruptible power supplies (UPS) and emergency generators with specified redundancy levels to ensure uninterruptible computing and data storage. However, in most data centers, while the sensitive electronics will continue to operate on UPSs and generators, the cooling system will shut down at least for a short period of time upon power interruption, and sensitive powered electronics may become overheated. Cooling systems typically draw too much power to be supported by UPSs but are usually backed-up by one or more generators. Even so, cooling equipment such as chillers and Direct Expansion (DX) cooling units require a relatively long time before they can support their rated cooling load following a power interruption. Consequently, electronics may operate for many minutes or tens of minutes until normal cooling has returned. Furthermore, most data center designs (utilizing "open" power paths) require that the power to cooling equipment be interrupted once again when switching back to primary (utility) power after it is restored. This causes another potentially lengthy delay until cooling equipment can once again return to their full rated cooling loads. Consequently, the timing of the "return to primary power" can also significantly affect the ultimate temperatures experienced by the electronic equipment.

The methods and systems disclosed herein improve the prediction of air and cooling temperatures, e.g., cooling fluid, in data centers that experience a transient event, such as a utility power failure. Maintaining reasonable IT inlet temperatures is a critical design goal, and they are typically a function of the room design, the IT load, the cooling architecture (e.g., the type of air distribution and containment), ambient (external temperatures), as well as the presence and connectivity to UPS devices. The cooling runtime, which refers to the time period during which critical equipment continues to receive airflow below a specified temperature threshold, is primarily determined by the system stored cooling capacity and the UPS and generator backup system design. A better understanding how the facility temperature changes during a cooling outage or after the cooling system is back online can allow data center operators and designers to better optimize the operation and design of a data center. Furthermore, transient predictions are valuable in efficiently controlling cooling and load in data centers. For instance, accurate transient temperature predictions can enable data center managers to mitigate temperature and load fluctuations with the thermal mass of the system. This aspect is especially useful when combined with the forecasting of transient changes, (e.g., weather-related power outages or cyclic load changes in the data center).

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Flow Network Model

Figure 2:
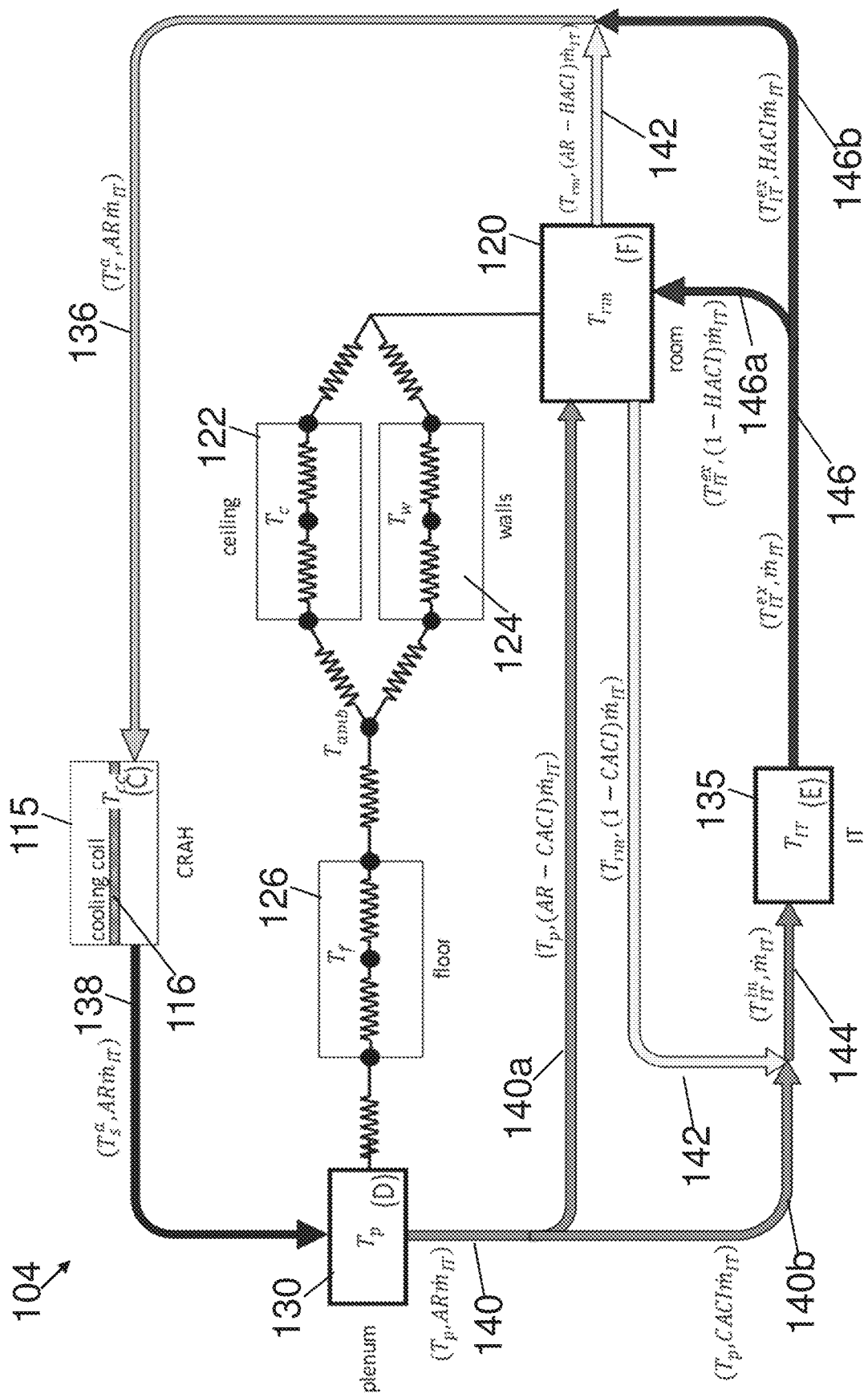
FIG. 2 shows a model of airflow for the example of the data center of FIG. 1.

Various embodiments may be described in reference to a flow network model of a data center. FIGS. 1 and 2 show models of a chilled water loop and an air loop respectively, for a data center having predominantly in-room cooling architecture with a raised floor plenum.

The model 102 of the chilled water loop shown in FIG. 1 models the interactions of water streams with a cooling coil 116 of a cooler 115 (i.e., in-room cooling equipment, which in FIG. 1 is a computer room air handler (CRAH) and includes all the coolers in the room to be cooled), a chiller 105, and a water storage tank 110.

The chilled water is supplied from the chiller 105 by pumps that circulate water through a network of pipes. Chilled water 108 leaves the chiller 105 having a temperature of $T_{ch}^{s}$ and enters a storage tank 110, where a certain volume of chilled water is stored to serve as a source of cooling during a transient event, such as a power failure. For instance, one or more pumps that pump the chilled water can be powered by a generator or, in some instances, a UPS device (e.g., before a generator provides power). Chilled water 108 leaves the chiller 105 and is stored in the storage tank 110. Chilled water from the storage tank 112 having a temperature of $T_{stor}$ then flows through a cooling coil 116 of the cooler 115. The return water from the cooler 119 has a temperature of $T_{co}$. At least a portion of chilled water from the storage tank 110 may also bypass the cooling coil 116 via a bypass loop 118 for control purposes. Water in the bypass loop 118 and the return water from the cooler 119 are mixed together to form the water 106 that returns to the chiller and has a temperature of $T_{ch}^{r}$.

The model 104 of the air loop shown in FIG. 2 depicts air flow in the data center. The air loop in a chilled water cooling scheme in the example shown in FIG. 2 includes the interaction of air streams with the CRAH mass, the plenum 130, IT equipment 135, the room 120, walls 124, floor 126, and ceiling 122.

Air 138 from the cooler 115 having a temperature of $T_{s}^{a}$ is introduced to the plenum 130 and mixes with air in the plenum to form air having a temperature of $T_{p}$. Air 140 from the plenum having temperature $T_{p}$ passes through perforated floor tiles (and various leakage paths) into the room 120 as air 140a. Air from the plenum 130 having temperature $T_{p}$ (and labeled 140b in FIG. 2) also mixes with air 142 from the room having a temperature of $T_{rm}$, to form air 144 having temperature $T_{IT}^{in}$ that enters an inlet of IT equipment 135, which includes all IT equipment (and is positioned in the room), such as servers positioned in equipment racks, and may also be referred to herein as an "equipment rack" or simply "rack." Air 144 which flows through IT equipment 135 exits an outlet of the IT equipment 135 as air 146 having a temperature of $T_{IT}^{ex}$. Air 146 exiting the IT equipment 135 with temperature $T_{IT}^{ex}$ enters the room 120 as air 146a. Air 146 exiting the IT equipment 135 with temperature $T_{IT}^{ex}$ also mixes with room air 142 having temperature $T_{rm}$ to form mixed room air 136 having temperature $T_{r}^{a}$ that returns to the cooler 115.

As will be explained in further detail below, the model shown in FIG. 2 also indicates that the temperature of the room air $T_{rm}$ is affected by heat transfer through the walls 124 and ceiling 122 to ambient (external to data center). The temperature of air in the plenum $T_{p}$ is also affected by heat transfer through the floor 126 to the plenum 130, or other external environment according to alternative configurations.

The model presented in FIGS. 1 and 2 shows a data center cooling configuration that includes a chilled water system applied to an in-room cooling architecture with a raised floor plenum, but it is to be appreciated that the model may be applied to other configurations as well, which are also within the scope of this disclosure. For instance, the model may be applied to an in-row cooling architecture where the model does not include a plenum. In addition, instead of a chilled water system that includes a CRAH, the cooling system may comprise an air-cooled CRAC direct expansion (DX) system that uses a refrigerant or an air system that uses air as the heat transport fluid. In such instances, one or more components of the model may be omitted (and/or different components included). The system may also not include a storage tank 110, and instead the water from the chiller 105 may go directly to the cooler 105 and/or bypass loop 118. Furthermore, the analysis used in the model can be applied to other applications and computing environments besides data centers (in a building), such as containers, modular systems, general IT environments, battery rooms, etc.

Figure 3:
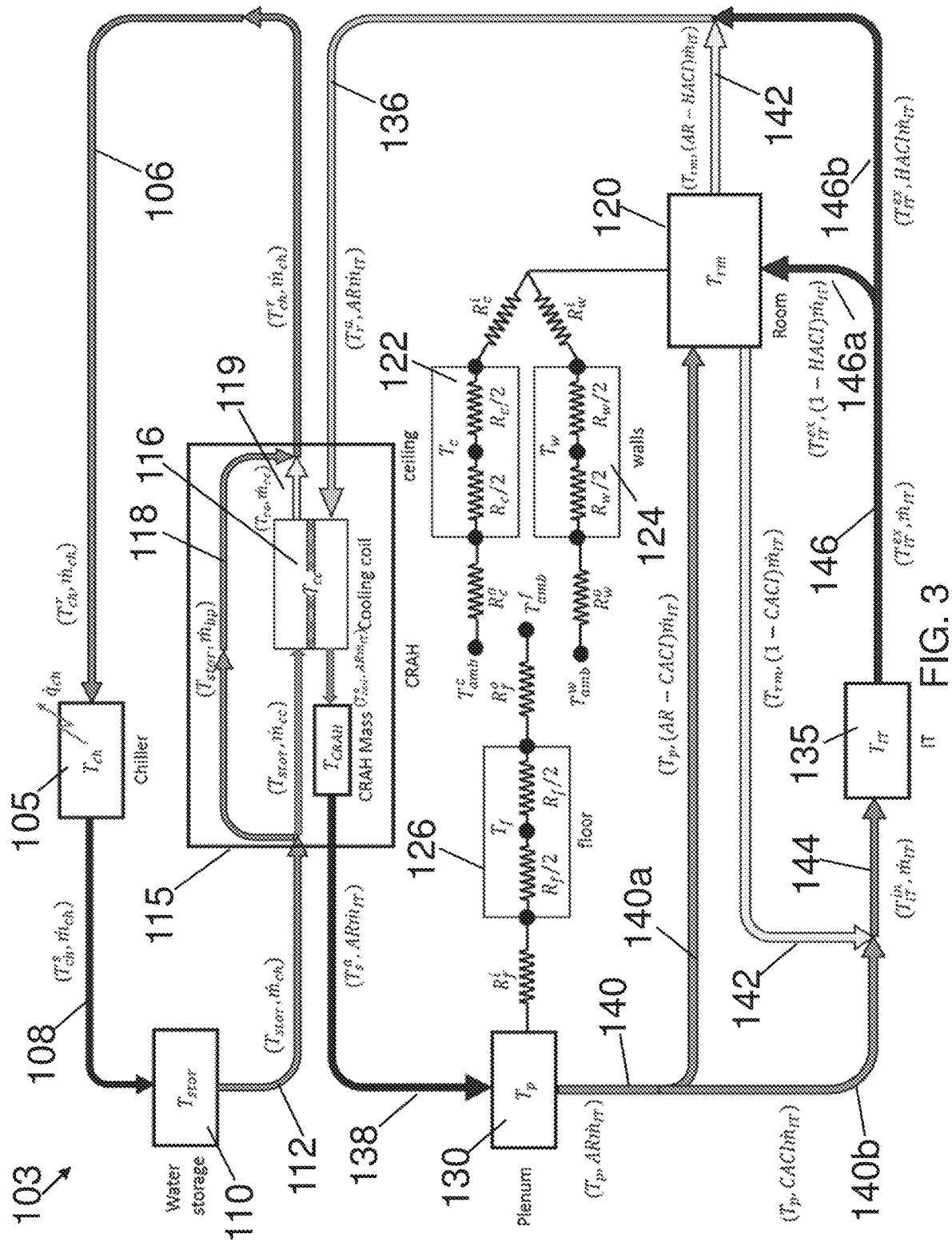
FIG. 3 shows a model of a combined chilled water system and airflow according to the models of FIGS. 1 and 2.

A combined model 103 of the air and water loops presented in FIGS. 1 and 2 is shown in FIG. 3. The combined model 103 shows how a chilled-water system is modeled as a combined system of heat added (IT equipment 135), heat removed (chiller 105), fluids (air and water), masses (chiller 105, cooler 115, IT equipment 135, room 120, plenum 130, walls 124, floor 126, ceiling 122, water storage 110), and outside temperatures (applied to the walls, ceiling, and floor).

According to one embodiment, a set of energy balance and heat transfer equations can be derived for the different components (control volumes) of the data center model, including the chiller 105, water storage tank 110, cooling coil 116, cooler 115, plenum 130, IT equipment 135, and the room 120, as well as the floor 126, ceiling 122, and walls 124 of the room 120.

One or more of the set of equations below include a representation of a thermal mass of one or more of the components of the data center, such as the IT equipment and the cooler. The term "thermal mass" (also referred to as "capacitance") generally describes a material's resistance to change in temperature, and is the product of its mass and specific heat. Furthermore, the "usefulness" or "availability" of the thermal mass depends on the intimacy of thermal contact the material has with its surroundings. For instance, the thermal mass of the cooler is accounted for and represented by the term on the right side of Equation (8) below, the thermal mass of the chiller is represented by the last term on the right side of Equation (1) below, and the thermal mass of the plenum air is represented by the last term on the right side of Equation (11) below. The thermal mass of other components, such as the water storage, room air, IT equipment, floor, ceiling, and walls are also included in Equations (3), (12), (14), (16), (17), and (18), respectively, below.

Chiller

The chiller 105 is configured to remove a quantity of heat from the system, while also including some available mass to slow transient temperatures in the data center. Equation (1) represents an energy balance equation for the chiller 105, which indicates that the chilled water supply temperature $T_{ch}^s$ can be expressed as a function of the energy removed by the chiller, the mass of the chiller, and the temperature of the chiller mass as indicated below:

$$c_p^{H_2O} \dot{m}_{ch}(T_{ch}^r - T_{ch}^s) = \dot{q}_{ch} + M_{ch} c_p^{ch} \frac{dT_{ch}}{dt} \quad (1)$$

where
$c_p^{H_2O}$ is the specific heat of water
$\dot{m}_{ch}$ is the mass flow rate of water through the chiller
$T_{ch}^r$ is the return temperature of water to the chiller
$T_{ch}^s$ is the supply temperature of the water from the chiller
$\dot{q}_{ch}$ is the heat removed by the chiller (total cooling load provided by the chillers)
$M_{ch}$ is the mass of the chiller
$T_{ch}$ is the temperature of the chiller mass The chiller is the only location for heat to leave the water loop of FIG. 1. The chiller may lack the ability to remove heat for multiple reasons, which include power failures, during periods of time the chiller is restarting, and during times when the chiller undergoes open starting, when the chiller switches power sources from a local power supply to utility power, which are all examples of transient events. The use of the term representing the heat removed by the chiller $\dot{q}_{ch}$ in Equation (1) allows for the ability to control the supply temperature of the chiller water as a function of the capacity of the chiller and to model power outages or restarts (i.e., transient event). Chiller downtime can be modeled by setting the chiller cooling power $\dot{q}_{ch}$ to be zero when the chiller is disconnected from primary power (i.e., off) or undergoing a restart process (which usually takes about 5-15 minutes).

If the chiller mass is modeled as a lumped capacitance, energy added to the mass (i.e., the heat transfer from the water to the chiller mass) is further modeled with $\epsilon_{ch}$, the thermal effectiveness of the chiller in Equation (2) below:

$$\epsilon_{ch} = \frac{T_{ch}^r - T_{ch}^s}{T_{ch}^r - T_{ch}} \quad (2)$$

Water Storage

The water storage tank 110 may be modeled as a well-mixed volume of water. The energy balance on the water storage tank 110 can be expressed as shown below in Equation (3):

$$\dot{m}_{ch}(T_{ch}^s - T_{stor}) = M_{stor}^{H_2O} c_p^{H_2O} \frac{dT_{stor}}{dt} \quad (3)$$

where
$\dot{m}_{ch}$ is the mass flowrate of the chiller
$T_{ch}^s$ is the chilled water supply temperature
$T_{stor}$ is the well-mixed temperature of the water stored in the storage tank
$M_{stor}^{H_2O}$ is the total mass of the chilled water buffer storage
$c_p^{H_2O}$ is the specific heat of the water According to some embodiments, the water storage is bypassed, and water from the chiller 105 may be sent directly to the cooler 115 and/or bypass loop 118. For example, a data center operator may wish to bypass the water storage tank 110 upon restart of the chiller 115 after a transient event. In this instance, $T_{stor}$ of Equation (3) is replaced with $T_{ch}^s$.

Cooling Coil

The cooling coil 116 of the cooler 115 controls the heat transferred from the airside to the water side by the cooler 115. The cooling coil 116 can be modeled with a steady-state heat exchange model that represents an energy balance equation for the cooling coil 116, as shown in Equation (4) below:

$$c_p^a AR \dot{m}_{IT}(T_r^a - T_{coil}^a) = c_p^{H_2O} \dot{m}_{cc}(T_{co} - T_{stor}) \quad (4)$$

where
$c_p^a$ is the specific heat of air
$c_p^{H_2O}$ is the specific heat of water
AR is the ratio of total cooling airflow to total IT airflow
$\dot{m}_{IT}$ is the mass flowrate of air through the IT equipment
$T_r^a$ is the cooler return air temperature
$T_{coil}^a$ is the temperature of the air inside the CRAH after it has passed the cooling coil
$\dot{m}_{cc}$ is the mass flowrate of water through the cooling coil
$T_{co}$ is the temperature of the water leaving the cooling coil
$T_{stor}$ is the temperature entering the cooling coil from the water storage tank For most data center configurations, the air ratio AR should be greater than 1.

The steady-state thermal effectiveness of the cooling coil dictates the overall heat transfer, and can be expressed as shown below in Equation (5):

$$\epsilon_{cc} = \frac{c_p^{H_2O} \dot{m}_{cc}(T_{co} - T_{stor})}{\min(c_p^a AR \dot{m}_{IT}, c_p^{H_2O} \dot{m}_{cc})(T_r^a - T_{stor})} \quad (5)$$

The thermal effectiveness of the cooling coil can be estimated using technical information from the cooler manufacturer.

The cooler's ability to handle different cooling loads can be modeled by changing the mass flow rate of water through the cooling coil $\dot{m}_{cc}$ within the expression $c_p^{H_2O} \dot{m}_{cc}(T_{co} - T_{stor})$ (i.e., the right side of Equation (4)). The mass flowrate of water through the cooling cool, $\dot{m}_{cc}$, must be less than or equal to the flowrate through the chiller, $\dot{m}_{ch}$ (see Equations (1) and (3)), which is utilized below when solving for the unknown terms in the system According to alternative embodiments, multiple equations may be used to model heat transfer between the cooling coil mass, the cooler airflow, and the cooler water flow. For example, one example of a set of equations representing thermal energy conservation for these types of cooler heat transfer are shown below in the thermal dynamic model represented by Equations A-C:

Equation A:

$$M_{wall} C_{wall} \frac{dT_{wall}}{dt} - (h'A)_h(T_h - T_{wall}) + (h'A)_c(T_{wall} - T_c) = 0$$

Equation B:

$$C_c^o \frac{dT_c}{dt} - (h'A)_c(T_{wall} - T_c) + (m'c_p)_c \frac{dT_c}{d(x/L_c)} = 0$$

Equation C:

$$C_h^o \frac{dT_h}{dt} + (h'A)_h(T_h - T_{wall}) + (m'c_p)_h \frac{dT_h}{d(y/L_h)} = 0$$

where
$M_{wall}$ is the mass of the wall of the cooler
$C_{wall}$ is the specific heat of the wall of the cooler
$T_{wall}$ is the temperature of the wall of the cooler
h' is the changing heat transfer coefficient (i.e., transient conditions behavior)
A is the area of heat transfer
$T_h$ is the temperature of the hot fluid
$T_c$ is the temperature of the cold fluid
$C^o$ is the fluid capacitance
m' is the changing mass flow rate (i.e., transient conditions behavior)
$c_p$ is the fluid specific heat
x,y are the physical length and direction of the cooler
subscript h is the hot fluid
subscript c is the cold fluid The thermal dynamic model provided by Equations A-C may be used in alternate embodiments to describe the heat transfer between the solid cooling coil and the two fluid streams in lieu of the approach described above, which incorporates the thermal effectiveness of the cooling coil.

Returning to FIG. 1, the model also includes equations for specifying how streams mix in the water loop. For instance, after water leaves the cooling coil, it mixes with water that bypasses the coil, $\dot{m}_{bp}$, to produce a total flowrate for the chiller, $\dot{m}_{ch}$, with a chiller return temperature of $T_{ch}^r$, yielding Equations (6) and (7) below:

$$\dot{m}_{bp}T_{stor} + \dot{m}_{cc}T_{co} = \dot{m}_{ch}T_{ch}^r \quad (6)$$

$$\dot{m}_{bp} + \dot{m}_{cc} = \dot{m}_{ch} \quad (7)$$

where
$\dot{m}_{cc}$ is the mass flowrate of water through the cooling coil
$\dot{m}_{bp}$ is the mass flowrate of water bypassing the coiling coil Cooler After air passes the coiling coil 116 of the cooler 115, it interacts with the mass of the CRAH (cooler 115) $M_{CRAH}$ and can be modeled using Equations (8) and (9) below:

$$c_p^a AR \dot{m}_{IT}(T_{coil}^a - T_s^a) = M_{CRAH} c_p^{CRAH} \frac{dT_{CRAH}}{dt} \quad (8)$$

$$\epsilon_{CRAH} = \frac{T_s^a - T_{coil}^a}{T_{CRAH} - T_{coil}^a} \quad (9)$$

where
$M_{CRAH}$ is the mass of the CRAH
$c_p^{CRAH}$ is the specific heat of the CRAH
$T_{CRAH}$ is the temperature of the CRAH mass
$\epsilon_{CRAH}$ is the steady-state thermal effectiveness of the CRAH mass In certain instances the thermal effectiveness of the cooler $\epsilon_{CRAH}$ is assumed to be a known constant. For instance, in some applications, the thermal effectiveness of the cooler may have a value in a range of about 0.7-0.9.

Air returns to the CRAH (cooler 115) at temperature $T_r^a$, and is expressed in Equation 10 as being a linear combination of room and IT equipment exhaust temperatures, $T_{rm}$ and $T_{IT}^{ex}$, respectively:

$$T_r^a = \left(1 - \frac{HACI}{AR}\right)T_{rm} + \frac{HACI}{AR}T_{IT}^{ex} \quad (10)$$

The hot aisle capture index (HACI) is described in further detail below.

Plenum

After interacting with the mass of the CRAH (cooler 115), the air passes through the plenum 130, where it comes into contact with the floor 126. The exiting plenum temperature $T_p$, can be described as a function of plenum air supply and room floor temperatures and thermal mass of the air in the plenum, as exemplified below in Equation (11), which provides an energy balance equation for air in the plenum:

$$c_p^a AR \dot{m}_{IT}(T_s^a - T_p) = \frac{T_p - T_f}{R_f^i | R_f/2} + M_p^a c_p^a \frac{dT_p}{dt} \quad (11)$$

where
$T_p$ is the temperature of the air in the plenum
$T_f$ is the temperature of the floor (slab)
$R_f^i$ the thermal resistance between the plenum air volume and the floor
$R_f$ is the thermal resistance of the floor itself
$M_p^a$ is the mass of the air in the plenum Room The volume of air in the room 120 is the combination of many airflow streams and interactions. Equation (12) represents the energy balance equation for the room 120, which includes the thermal mass of room air, airflow streams from the plenum and IT equipment, and heat transfer through the walls and ceiling:

$$c_p^a T_p(AR - CACI)\dot{m}_{IT} + c_p^a T_{IT}^{ex}(1 - HACI)\dot{m}_{IT} = \quad (12)$$
$$c_p^a T_{rm}\dot{m}_{IT}(1 + AR - HACI - CACI) +$$
$$\frac{T_{rm} - T_c}{R_c^i + R_c/2} + \frac{T_{rm} - T_w}{R_w^i + R_w/2} + M_{rm}^a c_p^a \frac{dt_{rm}}{dt}$$

where
CACI is the cold aisle capture index of the IT equipment
HACI is the hot aisle capture index of the IT equipment
AR is the ratio of total cooling airflow to total IT airflow
$c_p^a$ is the specific heat of air
$T_p$ is the temperature of air supplied from the plenum
$T_{rm}$ is the temperature of the (uncaptured) room air
$T_{IT}^{ex}$ is the exhaust temperature of air exiting the IT equipment
$\dot{m}_{IT}$ is the mass flowrate of the IT equipment
$R_c^i$ is the thermal resistance between room air and the ceiling
$R_c$ is the thermal resistance of the ceiling itself
$T_c$ is the temperature of the ceiling
$R_w^i$ is the thermal resistance between room air and the walls
$R_w$ the thermal resistance of the walls themselves
$T_w$ is the temperature of the walls
$M_{rm}^a$ is the mass of the air in the room Equation (12) characterizes the room airflow patterns with a flow network model that includes the air ratio AR, hot aisle capture index, and cold aisle capture index. The cold aisle capture index (CACI) for the IT equipment is defined as the fraction of air ingested by the IT equipment which originates from local cooling sources (e.g., air from the plenum 130 through the perforated floor tiles in FIG. 2, but in other embodiments may be a local cooler, such as a CRAC). The hot aisle capture index (HACI) is defined as the fraction of air exhausted by the IT equipment which is captured by local extracts (e.g., cooler 115 in FIG. 2, or return vents in other embodiments).

The values for the hot aisle and cold aisle capture indices may be determined based on the discussion in U.S. Pat. No. 7,991,592 (referred to herein as "the '592 patent") and U.S. Pat. No. 8,972,217 (referred to herein as "the '217 patent"), which are incorporated herein by reference in their entirety. As explained in the '592 patent, to track the airflow from each rack (IT equipment), one concentration species $C^i$ is used to individually identify the exhaust air from each rack in a detailed CFD simulation. The fraction of air exhausted from rack i that is captured by cooler (or local extract) j is determined using Equation D:

$$f_{ij} = \frac{C_j^i Q_j}{C_i^i Q_i} \qquad \text{Equation D}$$

where
$C_i^i$ is the concentration of species i prescribed at the exhaust or rack i
$C_j^i$ is the concentration of species i computed at the inlet of cooler j
$Q_i$ is the volumetric airflow rate through rack i
$Q_j$ is the volumetric airflow rate through cooler j
The capture index is the sum of the fractions of air exhausted from rack i which is captured by cooler j summed over all N local coolers, as shown below by Equation E:

$$CI_i = \sum_{j=1}^{N} \frac{C_j^i Q_j}{C_i^i Q_i} \qquad \text{Equation E}$$

Since the numerical value of $C_i^i$ is arbitrary, it is convenient to set $C_i^i = 1$ in the numerical analysis, making the capture index as shown below by Equation F:

$$CI_i = \sum_{j=1}^{N} \frac{C_j^i Q_j}{Q_i} \qquad \text{Equation F}$$

Unlike the cold-aisle capture index, the hot aisle capture index calculation depends on the rack (and cooler) airflow rates. The difference arises because while both variants of CI are defined with respect to rack airflow rates, the computed values of interest in cold-aisle analyses are rack-inlet concentrations while those in hot-aisle analyses are cooler-inlet concentrations.

HACI's may be computed from their constituent $f_{ij}$s which are defined as the fraction of airflow from rack i which is captured by cooling source j and is expressed below as Equation G:

$$HACI_i = \sum_{j=1}^{N} f_{ij} \qquad \text{Equation G}$$

where N is the number of local cooling sources. According to some embodiments, N in the HACI calculation may include all local cooling extracts (cooler returns, local exhaust grilles, etc.).

In a similar manner, in cold-aisle-CI calculations, cold-aisle CIs (CACIs) can be computed from their constituent $g_{ij}$s which are defined as the fraction of airflow of rack i which originated from cooling source j and is expressed below as Equation H:

$$CACI_i = \sum_{j=1}^{N} g_{ij} \qquad \text{Equation H}$$

According to some embodiments, N in the CACI calculation may include all local cooling supplies.

Thus, $f_{ij}$ and $g_{ij}$ may form the building blocks of HACI and CACI respectively, and they can function to characterize the multiple airflow streams which combine to make-up a rack's inlet and exhaust airflow patterns.

The above discussion considers individual HACI and CACI values for IT equipment racks, e.g., as computed by detailed CFD simulation, but as noted below, IT equipment in the present model is modeled as one lumped instance of the equipment rack. Thus, the HACI and CACI values for the model may also reflect an aggregate value, where all of the IT equipment racks are modeled as having the same value.

IT Equipment

The inlet temperature to the IT equipment $T_{IT}^{in}$, may be modeled as a function of the cold aisle capture index as indicated in Equation (13), and the IT exhaust temperature $T_{IT}^{ex}$ is a function of the thermal mass of the IT equipment, as indicated in Equations (14) and (15):

$$(1 - CACI)T_{rm} + CACI\, T_p = T_{IT}^{in} \qquad (13)$$

$$c_p^c \dot{m}_{IT}(T_{IT}^{in} - T_{IT}^{on}) + \dot{q}_{IT} = M_{IT} c_p^{IT} \frac{dT_{IT}}{dt} \qquad (14)$$

$$\epsilon_{IT} = \frac{T_{IT}^{ex} - T_{IT}^{in}}{T_{IT} - T_{IT}^{in}} \qquad (15)$$

where
$T_{IT}^{in}$ the inlet air temperature to the IT equipment
$T_{IT}^{ex}$ the exhaust temperature of air exiting the IT equipment
$\dot{q}_{IT}$ is the total heating load provided by the IT equipment (energy added by the IT equipment)
$M_{IT}$ is the mass of the IT equipment
$c_p^{IT}$ is the specific heat of the IT equipment
$\epsilon_{IT}$ is the steady-state thermal effectiveness of the IT equipment
$T_{IT}$ is the temperature of the of the IT equipment including the rack enclosures
In some instances the thermal effectiveness of the IT equipment $\epsilon_{IT}$ can be obtained from literature sources. For instance, according to some embodiments $\epsilon_{IT}$ can have a value of about 0.7 and 0.9. Likewise, the specific heat of the IT equipment $c_p^{IT}$ may also be obtained from the literature, and in certain embodiments has a value of about 650 J/(kg °C.).

The IT equipment model exemplified in Equations (13-15) indicates that the IT equipment is modeled as one lumped instance of the equipment rack. In other words, the model assumes that all racks in the room may be combined into one, unified rack object having the cumulative properties of all the racks. Similarly, all cooling supplies in the room may be combined into one cooling object. As explained further below, the values of HACI and CACI may be adjusted for different data center architectures and provide the specific value for IT inlet and cooler return temperatures without having to perform a full Computational Fluid Dynamics (CFD) analysis. CFD can, in theory, provide a desired level of detail but it is typically extremely slow, expensive, often inaccessible, and doesn't always converge to a consistent result.

According to alternate embodiments, an equation may be used to model heat transfer between the IT equipment and the air stream. One non-limiting example of such a model is represented in Equation I below:

$$M_{IT} c_p^{IT} \frac{T_{IT} - T_{IT}^*}{\Delta t} = h_{IT} A_{IT} (T_{rm} - T_{IT}) \quad \text{Equation I}$$

where
$M_{IT}$ is the mass of the IT equipment
$c_p^{IT}$ is the specific heat of the IT equipment
$h_{IT}$ is the convection heat transfer coefficient between the IT equipment and air in the room
$A_{IT}$ is the total exposed surface area of the IT equipment, which depends on the number of racks and their configurations
$T_{IT}^*$ is the surface temperature of the IT equipment before the time interval $\Delta t$
$T_{IT}$ is the surface temperature of the IT equipment after the time interval $\Delta t$ The model provided by Equation I may be used in alternate embodiments to describe the heat transfer between the IT equipment and the room air in lieu of the approach described above, which incorporates the thermal effectiveness of the IT equipment.

Floor, Ceiling, Walls

Returning to FIG. 2, heat exchange between the floor, ceiling, and walls to the ambient (exterior) can be represented by Equations (16), (17) and (18), respectively, below.

The temperature of the floor 126 is maintained through a model of the thermal resistance (heat transfer) between the plenum air, the floor, and the outside ambient, yielding Equation (16):

$$\frac{T_p - T_f}{R''_{fi} + R''_f / 2} = \frac{T_f - T_{amb}^f}{R''_{fo} + R''_f / 2} + M_f c_p^f \frac{dT_f}{dt} \quad (16)$$

where
$T_{amb}^f$ is the outside ambient temperature for the floor
$R''_{fo}$ is the thermal resistance between the outside and the floor
$R''_{fi}$ is the thermal resistance between the plenum air volume and the floor
$R''_f$ is the thermal resistance of the floor itself
$M_f$ is the mass of the floor
$c_p^f$ is the specific heat of the floor
$T_f$ is the temperature of the floor mass
$T_p$ is the temperature of the air in the plenum The temperature of the ceiling 122 is also maintained through a model of the thermal resistance between the room air, the ceiling, and an outside ambient temperature, yielding Equation (17):

$$\frac{T_{rm} - T_c}{R''_{ci} + R''_c / 2} = \frac{T_c - T_{amb}^c}{R''_{co} + R''_c / 2} + M_c c_p^c \frac{dT_c}{dt} \quad (17)$$

where
$T_{amb}^c$ is the outside ambient temperature for the ceiling
$R''_{co}$ is the thermal resistance between the outside and the ceiling
$R''_{ci}$ is the thermal resistance between room air and the ceiling
$R''_c$ is the thermal resistance of the ceiling itself
$M_c$ is the mass of the ceiling
$c_p^c$ is the specific heat of the ceiling
$T_c$ is the temperature of the ceiling mass The temperature of the walls is also maintained through a model of the thermal resistance between the room air, the walls, and an outside ambient temperature, yielding Equation (18):

$$\frac{T_{rm} - T_w}{R''_{wi} + R''_w / 2} = \frac{T_w - T_{amb}^w}{R''_{wo} + R''_w / 2} + M_w c_p^w \frac{dT_w}{dt} \quad (18)$$

where
$T_{amb}^w$ is the outside ambient temperature for the walls
$R''_{wo}$ is the thermal resistance between the outside and the walls
$R''_{wi}$ is the thermal resistance between room air and the walls
$R''_w$ is the thermal resistance of the walls themselves
$M_w$ is the mass of the walls
$c_p^w$ is the specific heat of the walls
$T_w$ is the temperature of the wall mass According to one embodiment, Equations (1)-(18) completely characterize the air and water systems under transient scenarios, e.g., a power outage. However, the inclusion of non-linear terms (e.g., Equations (1), (3), (8), (11), (14)) requires the use of iterative or nonlinear approaches. Two adjustments can be made to the model to decrease the computational complexity involved with solving non-linear systems by linearizing the set of equations.

The first adjustment makes the recognition that the flowrate through the cooling coil $\dot{m}_{cc}$ and the capacity of the chiller $\dot{q}_{ch}$ do not change instantaneously, and are also generally free variables when not at their limiting values. If the simulation includes enough time steps, or the time steps are sufficiently small, then the heat removed by the chiller $\dot{q}_{ch}$ and the mass flowrate of water through the cooling coil $\dot{m}_{cc}$ do not have to be solved for explicitly, and can instead be estimated using the result from the previous time step. The derivative terms associated with the thermal mass (e.g., the thermal mass terms of the chiller, water storage, cooler, plenum air, room air, IT equipment, floor, ceiling, and walls in Equations (1), (3), (8), (11), (12), (14), (16), (17), and (18), respectively) can thus be approximated with a forward differences discretization. For instance, the derivative terms may be discretized using an approximation of the form:

$$\frac{dT}{dt} \approx \frac{T - T^{prev}}{\Delta t}$$

where $\Delta t$ represents a finite duration of time (the "time step").

Equations (1)-(18) can then be solved in an iterative manner. The second adjustment allows for the capacity of the cooler (controlled by limiting $\dot{m}_{cc} \leq \dot{m}_{ch}$ in Equation (4)) and the capacity of the chiller (controlled by capping $\dot{q}_{ch}$ in Equation (1)), must be enforced at every time step, creating piecewise linear equations for Equations (1) and (4). Since these equations are monotonic as temperatures increase, the system temperatures can be solved by first assuming capacities are not met and then iteratively changing Equations (1) and (4) if the resulting temperatures force the chiller or cooler to reach its maximum capacity. This approach is shown in the process 400 of FIG. 4. Implementation of process 400 avoids the use of external nonlinear solution packages, which can be slow and unstable.

Figure 4:
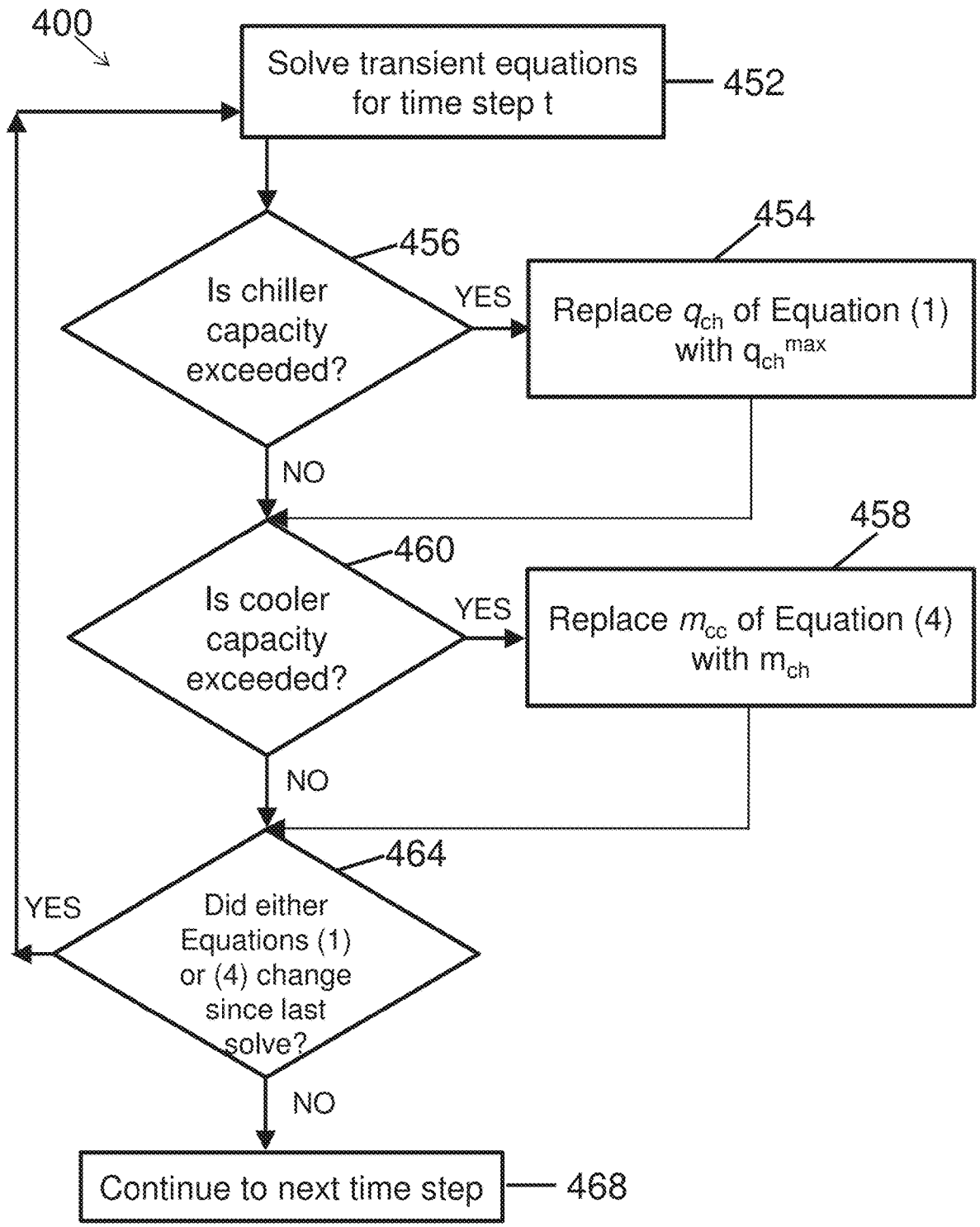
FIG. 4 is a flow chart of a process according to one or more aspects of the invention.

Process 400 of FIG. 4 begins at 452, where the transient equations, i.e., temperature values, are solved for time step "t." Any one of a number of different software codes may be used to solve the 18 equations simultaneously and to obtain the temperature values for that particular time step. At 456, a determination is made as to whether the chiller capacity has been exceeded. If no, then the process continues to 460. If yes, then $\dot{q}_{ch}$ of Equation (1) is replaced by the maximum capacity of the chiller $\dot{q}_{ch}^{max}$ at 454 and the process continues to 460. At 460, a determination is made as to whether the cooler capacity has been exceeded. If no, then the process continues to 464. If yes, then the mass flowrate of water through the cooling coil $\dot{m}_{cc}$ of Equation (4) is replaced by the mass flowrate of water through the chiller $\dot{m}_{ch}$ at 458 (since the mass flowrate through the cooling coil cannot exceed that of the chiller), and the process continues to 464. At 464, a query is made as to whether either steps 454 and 458 have been implemented, indicating that a term in Equation (1) and/or Equation (4) has been replaced. If yes, then the process is repeated and begins again at 452 using the new terms in Equations (1) and/or (4) for time step "t." If no, then the process continues for the next time step (t+1) and the process is repeated for the t+1 time step. The process is repeated for all the time intervals until the end, which is either specified or determined based on parameters designed into the software code.

The results obtained from solving the set of energy balance and heat transfer equations associated with the model described above may be used to predict temperatures in the data center, including the inlet temperature to at least one equipment rack and/or an outlet temperature of cooling fluid (e.g., air, water), associated with the cooling equipment. The results may also be used to calculate a cooling runtime for the data center. The model may be used for optimizing the transient performance of one or more components of the data center, such as the cooler, and may be used for adjusting one or more operating parameters of equipment in the data center, such as the equipment racks and/or cooling providers. For instance, a flowrate of a fluid (water, refrigerant, air) associated with a cooler may be adjusted, or electrical power associated with at least one equipment rack may be adjusted. In some instances, the operating parameter may include adjusting a source of electrical power provided to equipment in the data center. For example, equipment can be switched from one power source (e.g., utility power, generator) to another power source (e.g., generator, UPS). In other instances, the operating parameter may be associated with starting a generator or UPS device. In some instances, the adjustment may be performed to ensure that sufficient cooling is provided such that the maximum temperature of the data center or its components is not exceeded. In other instances, the adjustment may be performed for conserving energy or otherwise minimizing energy consumption. According to some embodiments, a design of a data center may be altered based on the results of the model, such as a predicted temperature. For example, a user of the data center design and management system may change the location of coolers or the types of coolers that are used in the actual layout of equipment or the proposed layout of equipment in the data center. These alterations may be implemented to improve the cooling performance and/or may be implemented to provide cost and/or power savings when the performance is found to be within predetermined specifications.

The results from the model may also be used to generate or otherwise provide a display or other type of visualization, such as those described herein in reference to FIG. 5 on a display device. For instance, the temperature prediction profiles generated from the model may be displayed to a user, and can be used for monitoring or controlling one or more components of the data center. For instance, temperature predictions and/or a cooling runtime can be used for controlling cooling equipment or equipment racks by a user or by a controller. As discussed in further detail below, the results from the model may be displayed as part of the implementation of a design system.

According to some embodiments, the model may be incorporated into a data center design system, which may be a stand-alone tool or may be built into a data center design platform, including a web-based software tool. This design aspect may be used to guide data center personnel through activities such as designing the data center structure, positioning equipment within the data centers prior to installation and repositioning equipment after construction and installation are complete. The design and accompanying analysis may allow the user to create models of data center configurations from which performance metrics (e.g., inlet and outlet temperatures of equipment racks and/or coolers) may be determined. Both the system and the user may then employ these performance metrics to determine alternative systems configurations that meet various design objectives. An optimized design can thus be obtained, and the results of the model may be used as part of a system to implement the design, e.g., to order equipment, ship equipment, and/or install equipment in a data center as per the optimized designed layout. In addition, the design of an existing data center may also be altered based on the results of the model. For instance, a user may change the location of components and/or cooling equipment to improve the performance of the data center, such as by reducing power consumption or other cost savings when the performance is found to be within predetermined specifications.

In certain embodiments, the results from the model may be used to provide warnings, error messages, or other information to a user (e.g., data center manager) via an interface such as a display device. For instance, a warning could be provided regarding the cooling runtime value or hot spots in the data center. In addition, assessments, suggestions or recommendations may be provided to a user, such as suggestions for improving the performance of the data center, such as by achieving additional cooling capacity (e.g., "install chilled water storage" or "power chilled-water pumps using UPS" or "power cooler fans to UPS"), or taking preventative measures before external events, such as weather forecasts, affect the power distribution. For instance, the system may suggest lowering the air supply temperatures, and in some instances, may take automatic action by controlling the air supply temperature in anticipation of such an external event. Furthermore, a controller may be programmed or instructed by a user to execute an automatic "power-down" protocol after a transient event such as a loss of power. In certain instances the model may be updated in real time with this information to provide an updated cooling runtime. As discussed below, one or more sensors (e.g., IT load, available cooling power, temperature data) may be used in obtaining real-time data for determining the cooling runtime.

According to some embodiments, one or more sensors positioned in an existing data center may be used in combination with the model of the data center. The sensors may be used to measure operating data of the data center, such as temperature, humidity, power consumption, pressure, airflow, flowrate, etc. For instance, the sensors may measure the flowrate of cooling fluid (e.g., water), the temperature of air exiting the IT equipment, the temperature of air exiting the cooler and/or plenum, the IT load (e.g., power consumption), available cooling power, the room temperature, etc. One or more of these measurements may be used as inputs to the model. In other embodiments, the measurement data may be compared against predicted values output by the model to verify and calibrate the model. For instance, the measured values may be used to calibrate transient or steady-state physical parameters of the model, such as capture indices, thermal resistances, etc.

In certain embodiments the model may be calibrated via one or more calibration parameters using one or more measurements. For instance, measurement data may be obtained during transient events, such as temperature data, power consumption data, airflow data, chilled water data, etc. and then stored as historic transient event data in a database or other storage device. The model may then be calibrated based on the historic transient event data. According to some embodiments, a calibration parameter may be applied to one or more estimated thermal mass values (e.g., see Table 2 below) of the model. For instance, a thermal mass calibration parameter may be applied to one or more of the thermal mass of the IT equipment, cooler, water storage, room air, plenum air, floor, ceiling, and walls. In some instances a different calibration parameter may be applied to each thermal mass. According to another aspect, the model may be re-calibrated as new historic transient event data is obtained.

For transient events where components of the cooling equipment, such as cooling fans or water pumps, are not connected to a UPS, the rise in air temperatures will not be slowed by mass in the CRAH (cooler 115) and the cooling loop will not have any effect. To model these scenarios, the AR, CACI, HACI, and the mass flow rate of the chiller $\dot{m}_{ch}$ are changed over time, such that:

(1) If no cooling fans are connected to a UPS, and no containment:
AR=0, CACI=0, and HACI=0

(2) If no cooling fans are connected to a UPS, and with containment:
CACI=$f_{CACI}$, and HACI=$f_{HACI}$ (3) If no pumps are connected to a UPS:
$\dot{m}_{ch}$=0

According to some embodiments, the performance of different cooling technologies, such as chilled water, DX, and systems that use air as the heat transport fluid, and different air delivery systems, such as raised floor, raised floor and dropped ceiling, flooded supply, and closed coupled cooling) will influence the values for the HACI and CACI used in Equations (10), (12), and (13). Table 1 below lists the coefficients for 13 different combinations of cooling and containment architectures. The CACI=Min{$f_{CACI}$AR,1} and the HACI=Min{$f_{HACI}$AR,1}, meaning that the product of the $f_{CACI}$ and the air ratio AR, as well as the product of the $f_{HACI}$ and the air ratio AR, are capped at 1. As will be appreciated, the list shown in Table 1 is not exhaustive, and other cooling and containment architectures may be included, as well as new cooling and containment architectures.

TABLE 1

Coefficients for Various Combinations of Cooling and Containment Architectures

| | Air Distribution | Containment | $f_{CACI}$ | $f_{HACI}$ |
|---|---|---|---|---|
| (1) | Raised floor | none | 0.7 | 0 |
| (2) | Raised floor | hot aisle | 0.7 | 0.9 |
| (3) | Raised floor | cold aisle | 0.9 | 0 |
| (4) | Raised floor with dropped ceiling return | none | 0.7 | 0.7 |
| (5) | Raised floor with dropped ceiling return | hot aisle | 0.7 | 0.9 |
| (6) | Raised floor with dropped ceiling return | cold aisle | 0.9 | 0.7 |
| (7) | Close-coupled | none | 0.8 | 0.8 |
| (8) | Close-coupled | hot aisle | 0.8 | 0.9 |
| (9) | Close-coupled | cold aisle | 0.9 | 0.8 |
| (10) | Flooded supply | none | 0.5 | 0 |
| (11) | Flooded supply | hot aisle | 0.5 | 0.9 |
| (12) | Flooded supply with dropped ceiling return | none | 0.5 | 0.7 |
| (13) | Flooded supply with dropped ceiling return | hot aisle | 0.5 | 0.9 |

In a flooded supply and return air distribution system (shown as (10) in Table 1), the only constraints to the supply and return air flow are the walls, ceiling, and floor of the room, which leads to heavy mixing of the hot and cold air flows. In a targeted or close-coupled supply and return air distribution system (shown as (7) in Table 1), a mechanism (e.g., duct, perforated tile, cooling unit placed within IT rows) directs the supply and return airflow within a targeted area, (e.g., 3 meters) of the IT equipment intake and exhaust. Raised floor air distribution system is a contained supply, where the IT equipment supply air flow is completely enclosed to eliminate air mixing between the supply and the return air streams. Table 1 includes different combinations of air distribution and containment.

The transient event used as the backdrop in discussing the above model focused on a power outage that created a complete loss of cooling capacity and predicting the resulting temperatures. It is to be appreciated that other types of transient events and their effects are also within the scope of this disclosure. For instance, the model may be used to predict the effect of partial cooling failures, as well as the implementation of quick-starting chillers, the usage of equipment with multiple cooling mechanisms, such as indirect air economizers with supplemental direct expansion (DX), and the effect of transient IT load or battery charging/discharging losses on temperatures.

Visualization

Figure 5A:
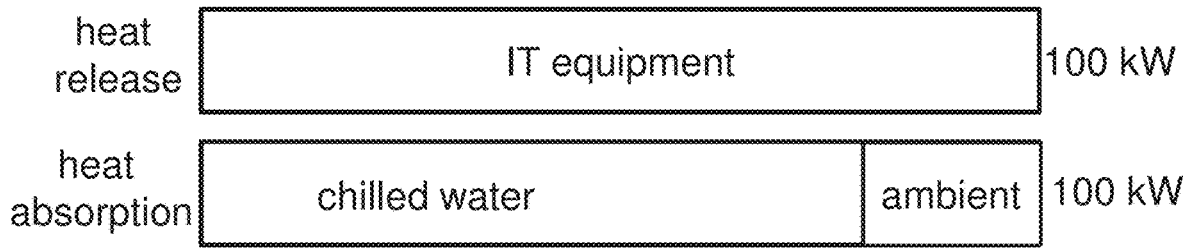
FIG. 5A shows one example of a results display that may be used in conjunction with a computer system in accordance with one or more aspects of the invention.
Figure 5B:
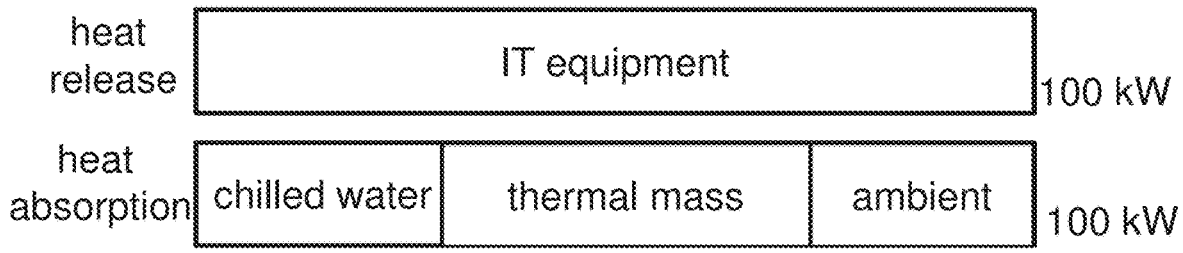
FIG. 5B shows another example of a results display that may be used in conjunction with a computer system in accordance with one or more aspects of the invention.
Figure 5C:
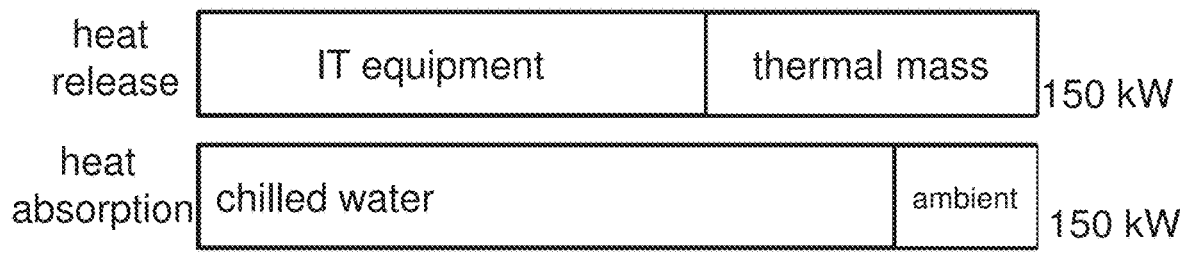
FIG. 5C shows yet another example of a results display that may be used in conjunction with a computer system in accordance with one or more aspects of the invention.

Components of one or more of Equations (1)-(18) can be used to produce a display or other type of visualization indicating where heat enters and leaves the data center at any given time. FIGS. 5A-5C shows the location of where heat is both released and absorbed into the data center by the IT equipment, the chilled water, the thermal mass of the chiller, and the ambient external environment, at three different time periods, and are discussed in further detail below. The results shown in FIGS. 5A-5C can be compiled by a computer processor and displayed to a user, and/or can be used for monitoring or controlling one or more components of the data center.

FIG. 5A is a steady state condition where heat energy (e.g., 100 kW) is released by the IT equipment. An equal amount of heat energy is absorbed by the chilled water of the cooler and the ambient environment through heat transfer processes. A larger portion of the heat is absorbed by the chilled water of the cooling system and the remaining smaller portion is absorbed by the ambient environment through the walls, floor, and ceiling of the room.

FIG. 5B is a loss of cooling scenario, where a power outage has affected the cooling equipment. FIG. 5B shows the heat release and absorption data in the system 10 minutes after the power outage. 100 kW of heat energy is still being released by the IT equipment (since the IT equipment is being powered by UPS devices). An equal amount of heat energy is absorbed by the chilled water, ambient environment (i.e., through the ceiling, floor, and walls of the room), and the thermal mass of the room's floor, ceiling, walls, room air, IT equipment, plenum air, and cooling coil.

FIG. 5C is a recovery scenario, where power has been restored to the cooling equipment. FIG. 5C shows the heat release and absorption data in the system 20 minutes after the power outage. 150 kW of heat energy is released, because not only is 100 kW of heat energy expended by the IT equipment, but during the power outage the thermal mass of the room's floor, ceiling, walls, and air, and the plenum air and cooler absorbed heat, which is now being released. Most of the heat is absorbed by the chilled water of the cooler and the remainder is absorbed by the ambient environment via heat transfer.

Components of Equations (1), (8), (11), (12), (14), (16), (17), and (18) can be used for determining the heat generation and heat absorption data that is use for generating the user displays shown in FIGS. 5A-5C, and are listed below in Table 2:

TABLE 2

Heat Release and Absorption Quantities

| Type | Quantity |
|---|---|
| Chilled water | $c_p^{H_2O} \dot{m}_{ch}(T_{ch}^r - T_{ch}^s)$ |
| Ambient | $\dfrac{T_c - T_{amb}^c}{R_{co}'' + R_c''/2} + \dfrac{T_f - T_{amb}^f}{R_{fo}'' + R_f''/2} + \dfrac{T_w - T_{amb}^w}{R_{wo}'' + R_{sw}''/2}$ |
| IT | $\dot{q}_{IT}$ |
| Thermal mass | $M_f c_p^f \dfrac{dT_f}{dt} + M_c c_p^c \dfrac{dT_c}{dt} + M_w c_p^w \dfrac{dT_w}{dt} + M_{rm}^a c_p^a \dfrac{dT_{rm}}{dt} +$ $M_{IT} c_p^{IT} \dfrac{dT_{IT}}{dt} + M_p^a c_p^a \dfrac{dT_p}{dt} + M_{CRAH} c_{cp}^{CRAH} \dfrac{dT_{CRAH}}{dt} +$ $M_{ch} c_p^{ch} \dfrac{dT_{ch}}{dt} + M_{stor} c_p^{H_2O} \dfrac{dT_{stor}}{dt}$ |

As will be appreciated, the depictions shown in FIGS. 5A-5C are not exhaustive. For example, graphs or charts of the changes of energy flow as a function of time may be displayed, or data may be displayed with greater detail, such as by indicating the individual contributions of the ceiling, floor, and walls to ambient, or by indicating the individual contributions of each thermal mass component, e.g., plenum air, room air, IT equipment, cooler, and building components (e.g., walls, ceiling, floor, etc.).

Figure 6:
FIG. 6 shows an input and results screen that may be used in conjunction with a computer system in accordance with aspects of the invention.

FIG. 6 shows a data entry and results screen 600 that may be used with one embodiment to allow a user to enter and manipulate data to obtain predicted results as part of a simulation. The simulation may be used for optimizing the transient performance of one or more components of the data center, such as the cooler, and may be used for adjusting one or more operating parameters of equipment in the data center, such as the equipment racks and/or cooling providers.

The screen 600 includes an input 650 section for inputting data that describes the data center, including the type of architecture used. One example input subsection is for the data center architecture 652, where data regarding the cooling system (e.g., chilled water, CRAC, air system, etc.), air distribution (e.g., raised floor, close-coupled, flooded, etc.), containment (e.g., none, hot aisle, cold aisle), white space area, ceiling height, total heat load, the number of racks, the rack U space utilization (e.g., 0-100%), and the average rack density. Another example input subsection is for data regarding the cooling equipment 654. The example shown in FIG. 6 is for a chilled water system with raised floor cooling, and includes inputs for the air supply temperature, cooling capacity, cooling to IT airflow ratio (i.e., AR from Equation (4) above), the ambient temperature (external environment temperature), the chilled water supply temperature, and the volume of the supplemental chilled water stored in the storage tank. The cooling equipment input 654 also includes an option for bypassing the storage tank during startup. In this instance, chilled water 108 from the chiller in FIG. 1 would bypass the storage tank 110, which would enter the cooler 115 and/or the bypass line 118 with a temperature of $T_{ch}^s$ instead of $T_{stor}$ for a predetermined length of time.

The equipment start time input 656 includes data regarding the generator start time (i.e., the period of time after a utility power outage is detected that the generator powers on), the chiller start time (i.e., the period of time that the chiller takes to start up once it receives power), the restart time configuration, as well as connectivity information, such as if cooling equipment including the cooler fans and chilled water pumps are connected to UPS devices. The restart time configuration can be open or closed (when utility power is restored). A "closed" or "closed transition" start configuration means that there is a mechanism (e.g., electronic) that automatically puts the generator voltage in sync with line power which allows the chiller to switch back from generator power to utility power instantaneously without having to undergo a complete restart again. In contrast, an "open" or "open transition" start configuration means that there is no such synchronizing hardware or mechanism, and the chiller needs to be disconnected from generator power before being switched over to utility power. Thus, the chiller will have to undergo a complete restart again, which has the potential of extending the period of time that cooling power is not available (e.g., a few more minutes).

A simulation input subsection 658 may also be used to provide parameters for the simulation, such as the simulation time, and the allowable maximum temperature of data center air (e.g., room, inlet, and return air temperatures), as well as temperature gradient options.

In at least one embodiment, calculations are run in real-time as the user enters or changes data in the entry boxes of the input section 650 with results also shown in real-time. The ability to manipulate the data and view the results in real-time allows a user to easily consider tradeoffs when designing or upgrading a data center. This allows the user to design data infrastructures to make sure the required maximum allowable temperature of IT equipment will not be exceeded during a transient event.

According to at least one embodiment, calculations may be performed in real-time as the user enters or changes data in the input section 650 and may be displayed in a results section 660. The example results section 660 shown in FIG. 6 includes a temperature graph that provides plots of temperature versus time for several temperature values in the data center. In different embodiments, different temperature parameters or other parameters may be plotted. For instance, in some embodiments, the heat flow visualization data shown in one or more of FIGS. 5A-5C may be shown. For the embodiment shown in FIG. 6, four temperature plots are shown on the graph, including the IT equipment inlet air temperature (e.g., $T_{IT}^{in}$ of FIG. 2), the cooler return air temperature (e.g., $T_r^a$ of FIG. 2) and the cooler supply air temperature (e.g., $T_s^a$ of FIG. 2), as well as the maximum allowable temperature for the room, which is set at 33° C. from input 658.

The results 660 of the simulation shown in FIG. 6 indicate that the temperature of the inlet air temperature to the IT equipment and the temperature of the air supplied to the cooler both increase almost immediately after the power goes out since the IT equipment is powered by the UPS, but the power to the fans, pumps, and chillers is not enabled (for at least the first 50 seconds until the generator starts). Once the generator is turned on, power is provided to the fans and pumps of the cooling system, which allows the thermal mass of the water in the pipes and storage tank to be utilized, and the temperatures start to decrease. However, the chiller is still powered off for the first 15 minutes, so the cooling effect created by the thermal mass of the circulating water is eventually depleted and the temperatures start to increase again. Once the chiller is powered on (15 minutes after the generator startup), the cooling effect allows the temperatures to decrease again and stabilize in about 38 minutes. Of the three temperatures simulated, the most fluctuation in temperature is predicted for the temperature of the air supplied to the cooler, and the least fluctuation in temperature is predicted for the cooler return air temperature.

In at least some embodiments of the invention discussed herein, the performance of assessments and calculations in real-time refers to processes that are completed in a matter of a few seconds or less rather than several minutes or longer as can happen with complex calculations, such as those involving typical CFD calculations.

In at least some embodiments described above, a design of a data center and/or actual operating parameters in a data center are altered based on predicted temperature and/or airflow and/or the change in temperature and/or airflow upon the occurrence of a transient event, such as a power failure, in a data center. For example, a user of the data center design and management system may change the location of coolers or the types of coolers that are used in the actual layout of equipment or the proposed layout of equipment in the data center. These alterations may be implemented to improve the cooling performance and/or may be implemented to provide cost and/or power savings when the performance is found to be within predetermined specifications. Further, based on determined airflow values, a data management system in accordance with one embodiment, may control one or more cooling providers to adjust the airflow, and/or control power to reduce power to one or more equipment racks if the airflow is not adequate to provide sufficient cooling.

In at least some embodiments described above, tools and processes are provided for determining temperatures and airflows in a data center. In other embodiments, the tools and processes may be used in other types of facilities, and may also be used in mobile applications, including mobile data centers. For example, according to some embodiments, a controller or processor implemented as part of a computing system as discussed in further detail below may be located in or used as part of a mobile data center to monitor and control various aspects of the data center, such as one or more operating parameters (e.g., cooling settings, flowrates, etc.). In some instances the controller may be configured to predict either a transient event and/or effects of a transient event, and incorporate or otherwise implement this information with the model in managing and controlling the data center.

In some embodiments, one or more of the methods disclosed herein may be implemented on a computerized control system. Various aspects may be implemented as specialized software executing in a general-purpose or specialized computer system 700 such as that shown in FIG. 7. The computer system 700 may include a processor 703 (also referred to herein as a controller) connected to one or more memory devices 717, such as a disk drive, solid state memory, or other device for storing data. Memory 717 is typically used for storing programs and data during operation of the computer system 700.

The processor 703 may be any device capable of executing a set of instructions (sequential or otherwise) that specify actions to be taken by that processing device. Further, while a single processor is illustrated, the term "processor" shall also be taken to include any collection of processors that individually or jointly execute a set (or multiple sets) of instructions to perform any one or more of the methodologies discussed herein.

Components of computer system 700 may be coupled by an interconnection mechanism 707 (also referred to herein as an interconnect system), which may include one or more busses (e.g., between components that are integrated within a same machine) and/or a network. The interconnection mechanism 707 enables communications (e.g., data, instructions) to be exchanged between system components of system 700. Computer system 700 includes one or more input devices 709, for example, a keyboard, mouse, trackball, microphone, a disk drive unit, a signal generation device (e.g., a speaker or remote control), or touch screen that functions as an interface through which a user may issue commands, data input, or programming to the system 700. In some embodiments the computer system 700 may include or be coupled to or in communication with one or more input devices 709 configured to communicate with facility systems 719 of a facility, for example, equipment associated with a data center, such as cooling equipment or IT equipment. Computer system 700 includes one or more output devices 721, for example, a printing device, speaker, and/or display devices, such as a display screen (e.g., a liquid crystal displays (LCD), a flat panel, a solid state display, or a cathode ray tube (CRT)). In some embodiments, the computer system 700 may include or be coupled to or in communication with the interconnection mechanism 707 to provide control signals to adjust one or more operating parameters of facility systems 719 of a facility. One or more sensors 713 may also provide input to the computer system 700. These sensors may include, for example, sensors which are capable of or are configured to measure one or more parameters external or internal to the data center, such as temperature, humidity, flow rate, airflow, solar intensity, power, flowrate, etc. In addition, computer system 700 may contain one or more interfaces (not shown) that connect computer system 700 to a communication network in addition to or as an alternative to the interconnection mechanism 707. These interfaces may be utilized by the central processing unit to collect data, for example, weather or solar data, from an external source such as a weather reporting service web site on the Internet.

Figure 8:
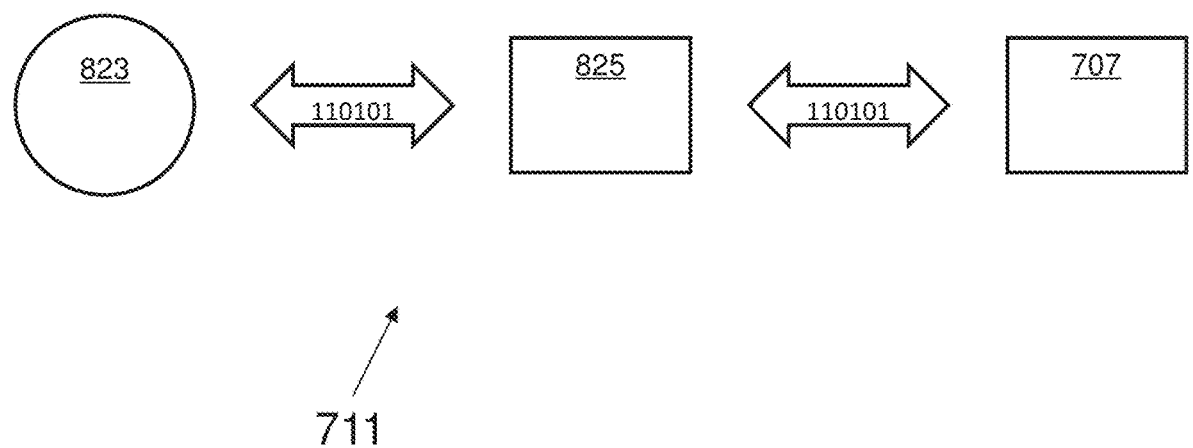
FIG. 8 is a schematic illustration of a memory system for the computer system of FIG. 7.

The storage system 711, shown in greater detail in FIG. 8, typically includes a computer readable and writeable nonvolatile recording medium 823 in which signals are stored that define a program to be executed by the processor or information to be processed by the program. The medium may include, for example, a disk or flash memory. Typically, in operation, the processor causes data to be read from the nonvolatile recording medium 823 into another memory 825 that allows for faster access to the information by the processor than does the medium 823. This memory 825 is typically a volatile, random access integrated circuit memory such as a dynamic random access memory (DRAM) or static memory (SRAM). It may be located in storage system 711, as shown, or in memory system 717. The processor 703 generally manipulates the data within the integrated circuit memory 717 and then copies the data to the medium 723 after processing is completed. A variety of mechanisms are known for managing data movement between the medium 823 and the integrated circuit memory element 717, and embodiments disclosed herein are not limited to any particular data movement mechanism. Embodiments disclosed herein are not limited to a particular memory system 717 or storage system 711.

The computer system may include specially-programmed, special-purpose hardware, for example, an application-specific integrated circuit (ASIC). Embodiments disclosed herein may be implemented in software, hardware or firmware, or any combination thereof. Further, such methods, acts, systems, system elements and components thereof may be implemented as part of the computer system described above or as an independent component.

Figure 7:
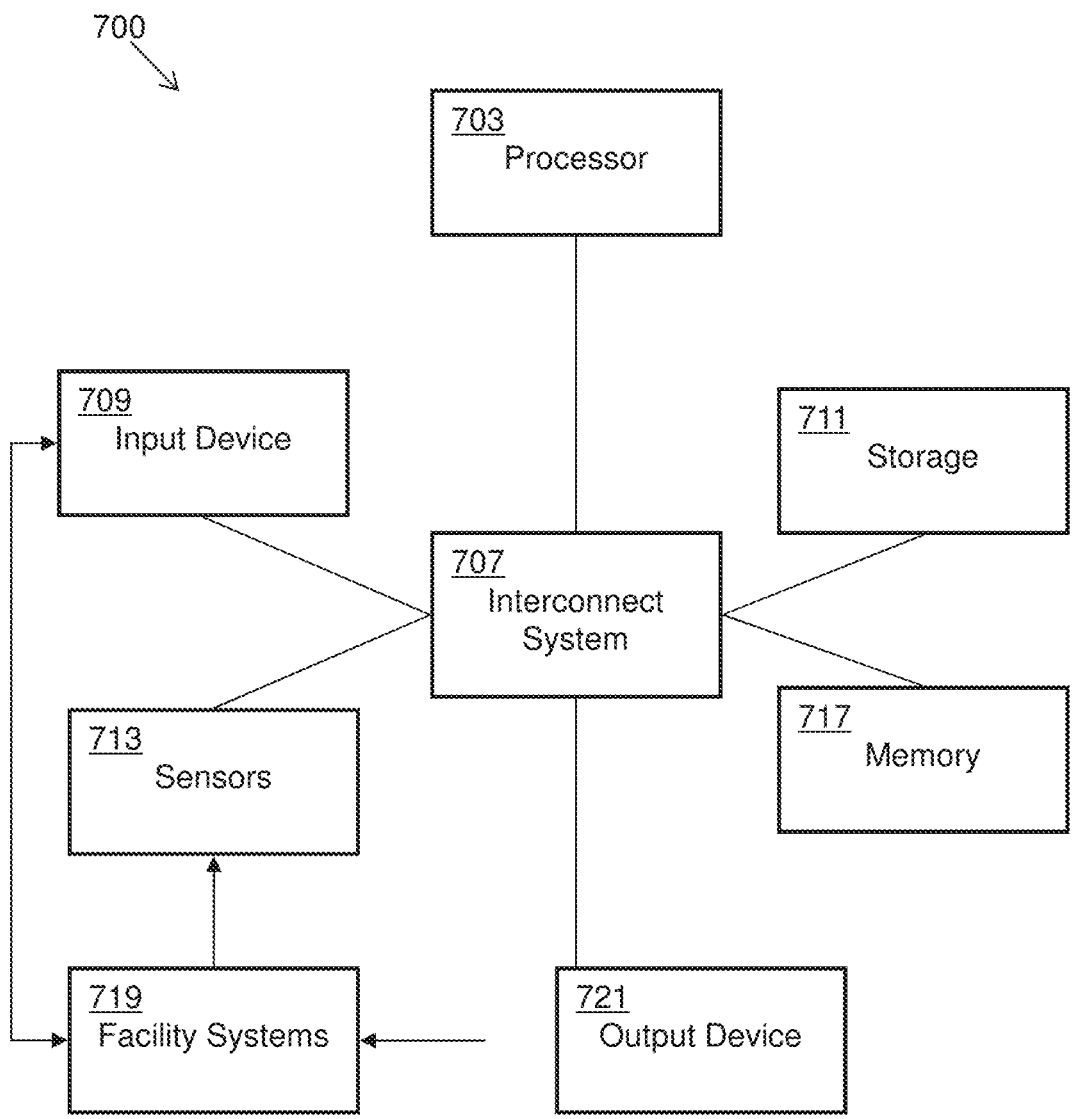
FIG. 7 is a schematic illustration of a computer system upon which methods disclosed herein may be performed.

Although computer system 700 is shown by way of example as one type of computer system upon which various embodiments disclosed herein may be practiced, it should be appreciated that the embodiments disclosed herein are not limited to being implemented on the computer system as shown in FIG. 7. Various embodiments disclosed herein may be practiced on one or more computers having a different architecture or components that that shown in FIG. 7.

Computer system 700 may be a general-purpose computer system that is programmable using a high-level computer programming language. Computer system 700 may be also implemented using specially programmed, special purpose hardware. In computer system 700, processor 703 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that embodiments disclosed herein are not limited to a particular computer system platform, processor, operating system, or network. Also, it should be apparent to those skilled in the art that the embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments disclosed herein may be distributed among one or more computer systems configured to provide a service (e.g., servers) to one or more client computers, or to perform an overall task as part of a distributed system. For example, various embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). In some embodiments one or more components of the computer system 700 may communicate with one or more other components over a wireless network, including, for example, a cellular telephone network.

It should be appreciated that embodiments disclosed herein are not limited to executing on any particular system or group of systems. Also, it should be appreciated that embodiments disclosed herein are not limited to any particular distributed architecture, network, or communication protocol. Various embodiments may be programmed using an object-oriented programming language, such as Small-Talk, Java, C++, Ada, or C# (C-Sharp). Other object-oriented programming languages may also be used. Alternatively, functional, scripting, and/or logical programming languages may be used. Various embodiments disclosed herein may be implemented in a non-programmed environment (e.g., documents created in HTML, XML or other format that, when viewed in a window of a browser program, render aspects of a graphical-user interface (GUI) or perform other functions). Various embodiments disclosed herein may be implemented as programmed or non-programmed elements, or any combination thereof.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, example systems are applicable to software, firmware, and hardware implementations.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method, comprising:
receiving input data related to a data center that includes at least one equipment rack and at least one cooling provider, the input data including data center architecture information, building data, operating data, and one of closed start-up and open start-up information for the at least one cooling provider;
generating, by a computing device, a model based on the input data and on a set of energy balance and heat exchange equations for the data center that account for heat added by the at least one equipment rack and removed by the at least one cooling provider, and a thermal mass of the at least one equipment rack and a thermal mass of the at least one cooling provider, the model configured to predict at least one temperature in the data center during a transient event; and
controlling a display device to display the at least one predicted temperature.

2. The method of claim 1, wherein the at least one predicted temperature includes an inlet temperature to the at least one equipment rack and an outlet temperature of cooling fluid associated with the at least one cooling provider.

3. The method of claim 1, wherein the building data includes thermal resistance data of a ceiling, walls, and floor of the data center.

4. The method of claim 3, wherein the set of energy balance and heat exchange equations for the model account for heat exchange between at least one of the ceiling, the walls, and the floor of the data center and an external environment to the data center.

5. The method of claim 1, wherein the input data includes a thermal effectiveness of the at least one equipment rack and the at least one cooling provider.

6. The method of claim 1, wherein the set of energy balance and heat exchange equations utilize a piecewise linear approximation for predicting the at least one temperature.

7. The method of claim 1, further comprising calculating a cooling runtime based on the model and displaying the calculated cooling runtime on the display device.

8. The method of claim 1, further comprising collecting operating data using at least one sensor positioned in the data center.

9. The method of claim 8, wherein the collected operating data includes at least one of a power measurement and a cooling flowrate measurement.

10. The method of claim 1, further comprising adjusting an operating parameter of equipment in the data center based on the model.

11. The method of claim 10, wherein the operating parameter includes a source of electrical power provided to equipment in the data center.

12. The method of claim 1, further comprising implementing a design of the data center based on the at least one predicted temperature.

13. A system, comprising:
a storage device;
a display device;
a controller coupled to the storage device and the display device and configured to:
receive input data from the storage device related to a data center that includes at least one equipment rack and at least one cooling provider, the input data including data center architecture information, building data, operating data, and one of closed start-up and open start-up information for the at least one cooling provider;
generate a model based on the input data and on a set of energy balance and heat exchange equations for the data center that account for heat added by the at least one equipment rack and removed by the at least one cooling provider, and a thermal mass of the at least one equipment rack and a thermal mass of the at least one cooling provider, the model configured to predict at least one temperature in the data center during a transient event; and
control the display device to display the at least one predicted temperature.

14. The system of claim 13, wherein the at least one predicted temperature includes an inlet temperature to the at least one equipment rack and an outlet temperature of cooling fluid associated with the at least one cooling provider.

15. The system of claim 13, wherein the set of energy balance and heat exchange equations for the model account for heat exchange between at least one of the ceiling, the walls, and the floor of the data center and an external environment to the data center.

16. The system of claim 13, further comprising an interface coupled to the storage device and configured to receive input data.

17. The system of claim 13, wherein the controller is further configured to generate a heat loss and heat generation profile for a time period following the transient event and to control the display device to display the generated heat loss and heat generation profile.

18. The system of claim 13, further comprising at least one sensor positioned in the data center and configured to measure operating data that is included in the input data stored on storage device.

* * * * *